US010005614B2

(12) United States Patent
Berrie et al.

(10) Patent No.: US 10,005,614 B2
(45) Date of Patent: Jun. 26, 2018

(54) SURFACE CONDITIONING OF CONVEYOR MATERIALS OR CONTACT SURFACES (71) Applicant: Hemlock Semiconductor Corporation, Hemlock, MI (US)

(72) Inventors: Jonathan Patrick Berrie, Midland, MI (US); John Victor Bucci, Midland, MI (US); James C. Mundell, Saginaw, MI (US); Traig William Savage, Midland, MI (US)

(73) Assignee: HEMLOCK SEMICONDUCTOR OPERATIONS LLC, Hemlock, MI (US)

( * ) Notice: Subject to any disclaimer, the term of this patent is extended or adjusted under 35 U.S.C. 154(b) by 0 days. days.

(21) Appl. No.: 15/053,677

(22) Filed: Feb. 25, 2016

(65) Prior Publication Data
US 2017/0246641 A1 Aug. 31, 2017

(51) Int. Cl.
*B65G 11/16* (2006.01)
*B65G 15/48* (2006.01)
(Continued)

(52) U.S. Cl.
CPC .............. *B65G 11/166* (2013.01); *B02C 4/12* (2013.01); *B02C 19/0056* (2013.01);
(Continued)

(58) Field of Classification Search
CPC ........ B65G 15/30; B65G 15/32; B65G 15/48; B65G 27/34; B65G 37/00;
(Continued)

(56) References Cited

U.S. PATENT DOCUMENTS 5,183,143 A * 2/1993 Sullivan, Jr. ........... B65G 27/34
198/359
6,063,697 A 5/2000 Wolf et al.
(Continued)

FOREIGN PATENT DOCUMENTS

CN 201711169 U 1/2011
CN 201729664 U 2/2011
(Continued)

OTHER PUBLICATIONS

Chinese Patent No. 102600948U; Date of Publication: Jul. 25, 2012; Abstract Only; 1 page.
(Continued)

*Primary Examiner* — Leslie A Nicholson, III
*Assistant Examiner* — Keith R Campbell
(74) *Attorney, Agent, or Firm* — Cantor Colburn LLP (57) ABSTRACT

A method of reducing contamination in a silicon product includes: moving silicon pieces along a conveyance system, wherein the conveyance system comprises a liner having a polished surface finish with a surface roughness of less than or equal to 12 microinches; and moving the silicon pieces across the conveyance system, wherein the silicon pieces contain a reduced number of impurities as compared to silicon pieces in contact with a liner having an unpolished surface. A crushing tool includes: crushing tool elements configured to crush silicon into fragments, wherein the crushing tool elements comprise a surface comprising a polished surface finish with a surface roughness of less than or equal to 12 microinches. A conveyance system includes: a first conveyor discharged onto a second conveyor; wherein the first conveyor comprises a first liner and wherein the second conveyor comprises a second liner.

14 Claims, 4 Drawing Sheets

(51) Int. Cl.
*B29D 29/06* (2006.01)
*B02C 19/00* (2006.01)
*B65G 37/00* (2006.01)
*B02C 4/12* (2006.01)

(52) U.S. Cl.
CPC ............ *B29D 29/06* (2013.01); *B65G 15/48* (2013.01); *B65G 37/00* (2013.01); *B65G 2201/042* (2013.01)

(58) Field of Classification Search
CPC ............ B65G 2201/042; B65G 11/163; B65G 11/166; B29D 29/06; B02C 19/0056; B02C 4/12
USPC ........................................................ 198/844.1
See application file for complete search history.

(56) References Cited

U.S. PATENT DOCUMENTS

| | | | |
|---|---|---|---|
| 6,375,011 B1 * | 4/2002 | Flottmann | B07B 1/469 |
| | | | 198/750.1 |
| 7,270,706 B2 | 9/2007 | Andrejewski et al. | |
| 7,549,600 B2 | 6/2009 | Hesse et al. | |
| 7,950,308 B2 | 5/2011 | Atsumi et al. | |
| 7,950,600 B2 | 5/2011 | Gruebl et al. | |
| 8,074,905 B2 | 12/2011 | Schaefer et al. | |
| 8,247,724 B2 * | 8/2012 | Mills | B65G 11/083 |
| | | | 193/30 |
| 8,926,749 B2 | 1/2015 | Arvidson et al. | |
| 8,955,781 B2 | 2/2015 | Sato | |
| 9,079,145 B2 * | 7/2015 | Baranowski | B01J 8/003 |
| 9,587,351 B2 * | 3/2017 | Manninen | D21F 1/0036 |
| 9,708,124 B2 * | 7/2017 | Lazarus | B65G 27/04 |
| 2004/0251333 A1 | 12/2004 | Arvidson et al. | |
| 2005/0224318 A1 * | 10/2005 | Hikida | B29C 43/222 |
| | | | 198/844.1 |
| 2006/0243834 A1 | 11/2006 | Schantz et al. | |
| 2008/0001012 A1 | 1/2008 | Wenzeis et al. | |
| 2010/0001106 A1 | 1/2010 | Schaefer et al. | |
| 2010/0025060 A1 | 2/2010 | Yamane et al. | |
| 2012/0156413 A1 | 6/2012 | Kondou et al. | |
| 2013/0277179 A1 * | 10/2013 | Teranishi | B65G 15/30 |
| | | | 198/834 |
| 2014/0023578 A1 | 1/2014 | Geersten | |
| 2014/0037959 A1 | 2/2014 | Wochner et al. | |

FOREIGN PATENT DOCUMENTS

| | | |
|---|---|---|
| CN | 201776156 U | 3/2011 |
| CN | 201832678 U | 5/2011 |
| CN | 102600948 U | 7/2012 |
| CN | 103204279 A | 7/2013 |
| CN | 203044126 U | 7/2013 |
| CN | 103372490 A | 10/2013 |
| CN | 103418459 A | 12/2013 |
| CN | 103721781 A | 4/2014 |
| CN | 203598865 U | 5/2014 |
| CN | 203635242 U | 6/2014 |
| CN | 203635251 U | 6/2014 |
| CN | 203648613 U | 6/2014 |
| CN | 104150055 A | 11/2014 |
| CN | 204816689 U | 12/2015 |
| DE | 19847100 A1 | 4/2000 |
| DE | 102012204050 A1 | 9/2013 |
| JP | 106242 A | 1/1998 |
| JP | 2012125670 A | 7/2012 |
| KR | 20110000338 A | 1/2011 |

OTHER PUBLICATIONS

Chinese Patent No. 103204279A; Date of Publication: Jul. 17, 2013; Abstract Only; 1 page.
Chinese Patent No. 103372490A; Date of Publication: Oct. 30, 2013; Abstract Only; 2 pages.
Chinese Patent No. 103418459A; Date of Publication: Dec. 4, 2013; Abstract Only; 1 page.
Chinese Patent No. 103721781A; Date of Publication: Apr. 16, 2014; Abstract Only; 1 page.
Chinese Patent No. 104150055A; Date of Publication: Nov. 19, 2014; Abstract Only; 1 page.
Chinese Patent No. 201711169U; Date of Publication: Jan. 19, 2011; Abstract Only, 1 page.
Chinese Patent No. 201729664U; Date of Publication: Feb. 2, 2011; Abstract Only, 1 page.
Chinese Patent No. 201776156U; Date of Publication: Mar. 30, 2011; Abstract Only; 1 page.
Chinese Patent No. 201832678U; Date of Publication: May 18, 2011; Abstract Only, 1 page.
Chinese Patent No. 203044126U; Date of Publication: Jul. 10, 2013; Abstract Only; 1 page.
Chinese Patent No. 203598865U; Date of Publication: May 21, 2014; Abstract Only; 1 page.
Chinese Patent No. 203635242U; Date of Publication: Jun. 11, 2014; Abstract Only; 1 Page.
Chinese Patent No. 203635251U; Date of Publication: Jun. 11, 2014; Abstract Only; 1 page.
Chinese Patent No. 203648613U; Date of Publication: Jun. 18, 2014; Abstract Only; 1 page.
Chinese Patent No. 204816689U; Date of Publication: Dec. 2, 2015; Machine Translation; 6 pages.
German Patent No. 102012204050A1; Date of Publication: Sep. 19, 2013; Machine Translation; 9 pages.
German Patent No. 19847100A1; Date of Publication: Apr. 20, 2000; Abstract Only; 1 page.
Japanese Patent No. 106242A; Date of Publication: Jan. 13, 1998; Abstract only; 1 page.
Japanese Patent No. 2012125670A; Date of Publication: Jul. 5, 2012; Abstract Only; 1 page.
Korean Patent No. 20110000338A; Date of Publication: Jan. 3, 2011; Abstract Only; 1 page.

* cited by examiner

SURFACE CONDITIONING OF CONVEYOR MATERIALS OR CONTACT SURFACES

TECHNICAL FIELD

Disclosed herein are methods for reducing contamination in a silicon product. Also disclosed herein are crushing tools and conveyance systems.

BACKGROUND

Polysilicon is used as a starting material for semiconductors or wafers in solar applications. The use of such polysilicon must be highly pure (e.g., for semiconductor applications at least 99.9999999% pure (i.e., nine nines pure) and for solar applications at least 99.9% pure. In order to prevent issues with a reduction in desired properties, such as electrical properties, the polysilicon should not be mixed with metal impurities wherever possible.

Polysilicon is typically produced by reducing a silicon compound, such as trichlorosilane, with hydrogen and formed into rods. The polysilicon rods are then crushed or broken into smaller pieces. Contaminant or impurities imparted to the polysilicon pieces during the crushing can be removed by etching after which the polysilicon is passed through water and dried and then conveyed to be sorted for further processing or packaging. During each step, the polysilicon can be contaminated with impurities such as metal or polymeric impurities. Steps must be taken to prevent this contamination that will affect the purity of the polysilicon product.

SUMMARY

A method of reducing contamination in a silicon product, comprises: moving silicon pieces along a conveyance system, wherein the conveyance system comprises a liner having a polished surface finish with a surface roughness of less than or equal to 12 microinches; and moving the silicon pieces across the conveyance system, wherein the silicon pieces contain a reduced number of impurities as compared to silicon pieces in contact with a liner having an unpolished surface.

A crushing tool, comprising: crushing tool elements configured to crush silicon into fragments, wherein the crushing tool elements comprise a surface comprising a polished surface finish with a surface roughness of less than or equal to 12 microinches; and wherein the crushing tool elements comprise a material comprising tungsten, carbon, cobalt, or a combination comprising at least one of the foregoing.

A conveyance system, comprising: a first conveyor discharged onto a second conveyor, wherein the first conveyor is at a height, h1, and the second conveyor is at a height, $h_2$, wherein $h_1$ is greater than $h_2$; wherein the first conveyor comprises a first liner and wherein the second conveyor comprises a second liner; wherein the first liner and the second liner comprise a material comprising tungsten, carbon, cobalt, nickel, chromium, or a combination comprising at least one of the foregoing.

BRIEF DESCRIPTION OF THE DRAWINGS

The following is a brief description of the drawings wherein like elements are numbered alike and which are exemplary of the various embodiments described herein.

DETAILED DESCRIPTION

Disclosed herein are methods of reducing contamination in a silicon product. Also disclosed herein are crushing tools, which can include a surface comprising a polished surface as well as methods of repairing the crushing tool. A conveyance system is also disclosed, where the conveyance system can include a conveyor comprising a liner. The liner can include various materials including, but not limited to tungsten, carbon, cobalt, nickel, chromium, or a combination comprising at least one of the foregoing, for example, tungsten carbide, tungsten carbide with a cobalt binder, tungsten carbide with a nickel binder, $Cr_2C_3$, $Cr_2C_3$ with NiCr binder, or a combination comprising at least one of the foregoing.

It can be challenging to prevent and/or control contamination of silicon product after it has been broken from rods into smaller pieces or chunks and moved along a conveyance system to various stations for subsequent processing. It was surprisingly discovered that using a liner having a polished surface finish in a conveyance system, can assist in reducing the number of impurities present in the silicon product. For example, using a liner in a conveyance system, where the liner has a polished surface finish having a surface roughness of less than or equal to 12 microinches, can be successful at imparting less impurities to the silicon product as compared to silicon product in contact with no liner or with a liner having an unpolished surface finish.

The surface roughness can include values of less than or equal to 12 microinches, for example, less than or equal to 8 microinches, for example, less than or equal to 4 microinches, for example, less than or equal to 2 microinches. For example, the surface roughness can be 0.5 microinch to 12 microinches, for example, 1 microinch to 8 microinches.

The liner can comprise a material comprising tungsten, carbon, cobalt, or a combination comprising at least one of the foregoing. For example, the liner material can comprise tungsten, carbon, cobalt, nickel, chromium, or a combination comprising at least one of the foregoing, for example, tungsten carbide, tungsten carbide with a cobalt binder, tungsten carbide with a nickel binder, $Cr_2C_3$, $Cr_2C_3$ with NiCr binder, or a combination comprising at least one of the foregoing. The liner material can comprise tungsten carbide and cobalt.

A crushing tool can include various crushing tool elements that can be configured to crush silicon rod into fragments. The crushing tool elements can include a surface. The surface can be polished such that the surface roughness of the polished surface finish is less than or equal to 12 microinches, for example, less than or equal to 8 microinches, for example, less than or equal to 4 microinches, for example, less than or equal to 2 microinches. For example, the surface roughness can be 0.5 microinch to 12 microinches, for example, 1 microinch to 8 microinches. The various crushing tool elements can comprise a material comprising tungsten, carbon, cobalt, or a combination comprising at least one of the foregoing.

The crushing tool can be repaired, for example, if any of the surfaces of the various crushing tool elements have a surface roughness of greater than or equal to 12 microinches. When the surface roughness is greater than or equal to 12 microinches for a particular crushing tool element, the crushing tool element can be removed from the crushing tool. The crushing tool element can then be ground and/or polished until the surface roughness is less than or equal to 12 microinches, for example, less than or equal to 8 microinches, for example, less than or equal to 4 microinches, for example, less than or equal to 2 microinches. For example, the surface roughness can be ground and/or polished to 0.5 microinch to 12 microinches, for example, 1 microinch to 8 microinches. After grinding and/or polishing, the crushing tool element can be reinstalled in the same position on the crushing tool for reuse. The crushing tool element can be installed to a different crushing tool for reuse. By reusing the various elements of the crushing tool, monetary savings can be achieved by reducing or removing the need to purchase and install new crushing tool elements.

The various crushing tool elements can include, but are not limited to, a rotary crusher roll, a stationary jaw plate, a movable jaw plate, a jaw cavity, or a hopper.

Figure 1:
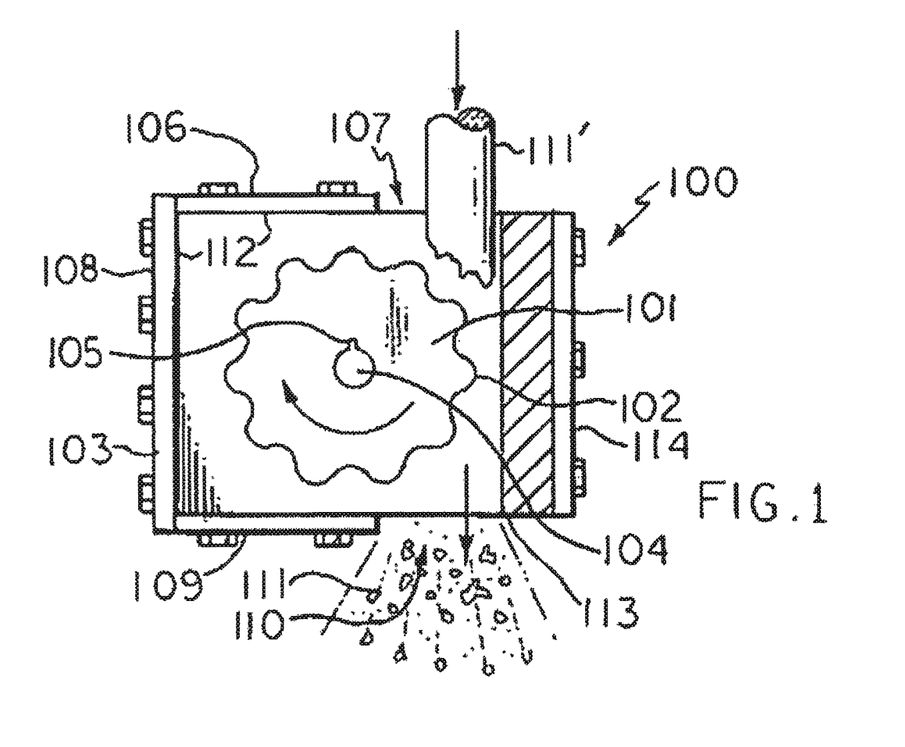
FIG. 1 is a side cross-sectional view of a crushing tool as described herein.

FIG. 1 shows a crushing tool 100 as described herein. As shown in FIG. 1, crushing tool (e.g., a single roll crusher) 100 includes a roll 101 with teeth 102 spaced around the circumference of the roll 101. The roll 101 is mounted as a rotary inside a housing 103 on a shaft 104. Set screws 105 mounted on shaft 104 maintain the position of the roll 101 on the shaft 104.

The housing 103 comprises a top 106 having an entrance port 107, sides 108, and bottom 109 having an exit port 110. The top 106, sides 108, and bottom 109 define a cavity inside the housing 103 in which the roll 101 is mounted. The roll 101, teeth 102, and at least the inside surfaces 112 of top 106, sides 108, and bottom 109 comprise materials that minimize contamination of silicon, such as materials possessing a hardness greater than or comparable to polycrystalline silicon. The roll 101, teeth 102, and at least the inside surfaces 112 of top 106, sides 108, and bottom 109 can comprise tungsten, carbon, cobalt, nickel, chromium, or a combination comprising at least one of the foregoing, for example, tungsten carbide, tungsten carbide with a cobalt binder, tungsten carbide with a nickel binder, $Cr_2C_3$, $Cr_2C_3$ with NiCr binder, or a combination comprising at least one of the foregoing. Use of tungsten carbide containing materials can assist in reducing the level of iron contaminants imparted to silicon by the crushing operation.

Polycrystalline silicon rods 111' may be fed into the crushing system 100 through the entrance port 107. Polycrystalline silicon pieces 111 that have been processed through the single roll crusher 100 exit through the exit port 110.

The inside surface 112 of side 108 opposite the roll 101 comprises a flat plate 113 mounted to a movable assembly 114. The movable assembly 114 allows the distance between the flat plate 113 and the roll 101 to be adjusted such that the size of the polycrystalline silicon pieces 111 may be controlled. Polishing can be effected on inside surfaces 112 of top 106, sides 108, and bottom 109, the roll 101, and the teeth 102.

Once the silicon product has been formed, i.e., the silicon has been broken into pieces by the crushing tool 100, the product can be moved along a conveyance system. A conveyance system can include a first conveyor and a second conveyor. The first conveyor can be disposed above a second conveyor. The first conveyor can be at a height, $h_1$. The second conveyor can be at a height, $h_2$. The height, $h_1$, can be greater than the height, $h_2$. The first conveyor can comprise a first liner. The second conveyor can comprise a second liner. The first liner and/or the second liner can include a material comprising tungsten, carbon, cobalt, nickel, chromium, or a combination comprising at least one of the foregoing, for example, tungsten carbide, tungsten carbide with a cobalt binder, tungsten carbide with a nickel binder, $Cr_2C_3$, $Cr_2C_3$ with NiCr binder, or a combination comprising at least one of the foregoing.

Figure 2:
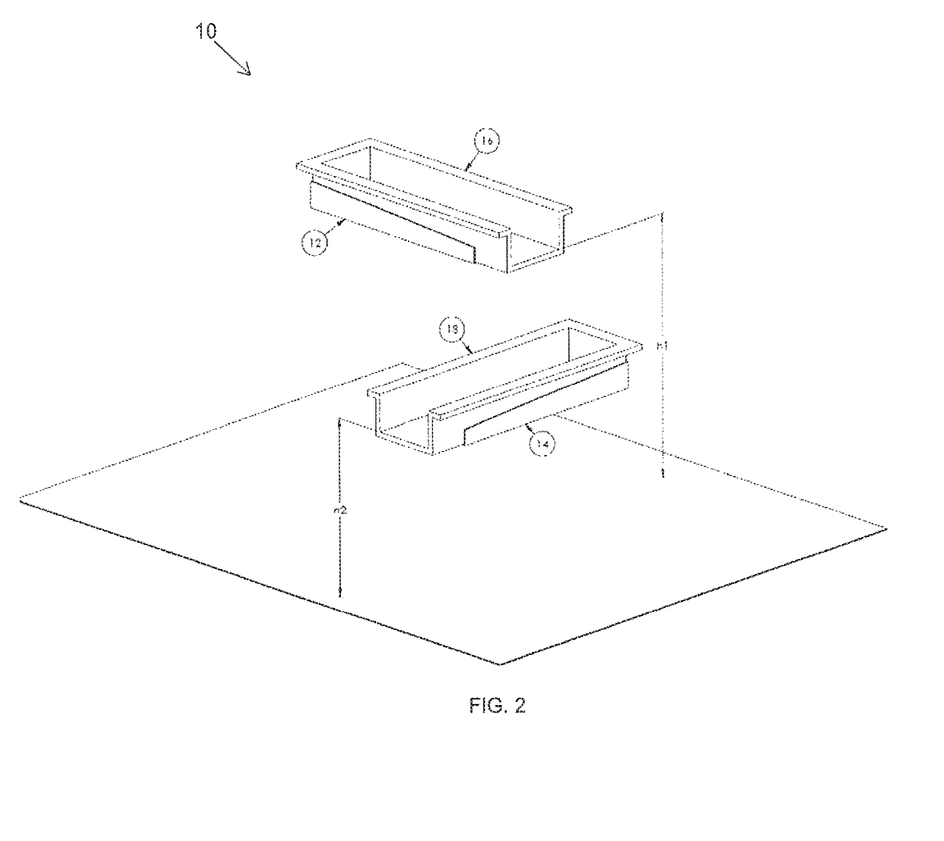
FIG. 2 is an isometric view of a conveyance system as described herein.

A conveyance system 10 is shown in FIG. 2, where a first conveyor 12 includes a first liner 16. The first conveyor 12 has a height, $h_1$. The first conveyor 12 is discharged onto a second conveyor 14, which includes a second liner 18. The second conveyor has a height, $h_2$. As can be seen in FIG. 2, the height, $h_1$, of the first conveyor 12 is greater than the height, $h_2$, of the second conveyor 14.

The first liner and/or the second liner can have a polished surface finish with a surface roughness of less than or equal to 12 microinches, for example, less than or equal to 8 microinches, for example, less than or equal to 4 microinches, for example, less than or equal to 2 microinches. For example, the surface roughness can be 0.5 microinch to 12 microinches, for example, 1 microinch to 8 microinches. The surface roughness can remain less than or equal to 12 microinches both before and after silicon pieces are moved through the conveyance system, i.e., from the first conveyor to the second conveyor.

The conveyance system can be repaired by removing a portion of the first conveyor and/or the second conveyor from the conveyance system when the portion of the conveyance system has a surface roughness of greater than 12 microinches. Generally, repair is performed when part of the conveyance system (e.g., the liner) chips or breaks, exposing a new surface. Chips or breaks can occur through normal use of the conveyance system. The new surface can have a surface roughness of greater than 12 microinches. For example, if the first liner and/or the second liner has a surface roughness of greater than 12 microinches, it can be removed from the first conveyor or the second conveyor to be repaired. After removal, the surface of the portion of the conveyance system that has been removed for repair can be ground and/or polished so that the surface has a surface roughness of less than or equal to 12 microinches, for example, less than or equal to 8 microinches, for example, less than or equal to 4 microinches, for example, less than or equal to 2 microinches. For example, the surface roughness can be ground and/o machined to 0.5 microinch to 12 microinches, for example, 1 microinch to 8 microinches. After grinding and/or polishing, the portion of the first conveyor and/or the second conveyor can be reinstalled to the same conveyance system for reuse. The portion (e.g., liner) of the first conveyor and/or the second conveyor can be installed to a different conveyance system for reuse. By reusing this portion of the conveyance system, monetary savings can be achieved by reducing or removing the need to purchase and install new conveyors and/or liners.

Methods of reducing contamination in a silicon product are continually desired. With the use of the methods disclosed herein, a reduction in the amount of impurities present in a silicon product can be accomplished. A method for reducing contamination in a silicon product can include, moving silicon pieces along a conveyance system. The conveyance system can include a liner having a polished surface finish with a surface roughness of less than or equal to 12 microinches, for example, less than or equal to 8 microinches, for example, less than or equal to 4 microinches, for example, less than or equal to 2 microinches. For example, the surface roughness can be 0.5 microinch to 12 microinches, for example, 1 microinch to 8 microinches. The silicon pieces can be moved across the conveyance system. The silicon pieces can have a reduced number of impurities as compared to silicon product in contact with a liner having an unpolished surface finish.

The conveyance system can include at least one conveyance device configured to move silicon pieces from a starting point to a finishing point. The method can optionally include moving the silicon pieces from a first conveyance device to a second conveyance device. The first conveyance device can be disposed above the second conveyance device or vice versa. The surface roughness of a liner of the second conveyance device can remain unchanged when the silicon pieces are dropped from the first conveyance device onto the second conveyance device.

The liner can include a material comprising tungsten, carbon, cobalt, nickel, chromium, or a combination comprising at least one of the foregoing, for example, tungsten carbide, tungsten carbide with a cobalt binder, tungsten carbide with a nickel binder, $Cr_2C_3$, $Cr_2C_3$ with NiCr binder, or a combination comprising at least one of the foregoing. The liner can include a material comprising tungsten carbide and cobalt. The liner can include a material having less than or equal to 20 weight percent cobalt, for example, less than or equal to 15 weight percent cobalt, for example, less than or equal to 10 weight percent cobalt.

A method of reducing contamination in a silicon product can include moving silicon pieces from a first conveyor to a second conveyor. The first conveyor can be disposed above a second conveyor. The first conveyor can be at a height, $h_1$. The second conveyor can be at a height, $h_2$. The height, $h_1$, can be greater than the height, $h_2$. The first conveyor can comprise a first liner. The second conveyor can comprise a second liner. The first liner and/or the second liner can include a material comprising tungsten, carbon, cobalt, nickel, chromium, or a combination comprising at least one of the foregoing, for example, tungsten carbide, tungsten carbide with a cobalt binder, tungsten carbide with a nickel binder, $Cr_2C_3$, $Cr_2C_3$ with NiCr binder, or a combination comprising at least one of the foregoing. The first liner and/or the second liner can include a material comprising tungsten carbide and cobalt, wherein the cobalt can be present in an amount of equal to 20 weight percent cobalt, for example, less than or equal to 15 weight percent cobalt, for example, less than or equal to 10 weight percent.

The first liner can have a polished surface finish of less than or equal to 12 microinches. The second liner can have a polished surface finish of less than or equal to 12 microinches both before and after the silicon pieces are moved from the first conveyor to the second conveyor. For example, the first liner and/or the second liner can have a polished surface finish of less than or equal to 8 microinches, for example, less than or equal to 4 microinches, for example, less than or equal to 2 microinches. For example, the surface roughness can be 0.5 microinch to 12 microinches, for example, 1 microinch to 8 microinches. The method can further comprise moving the silicon pieces across the second conveyor. The silicon piece can contain a reduced or smaller number of impurities as compared to silicon impurities in contact with no liner or with a liner having an unpolished surface finish.

The first liner and/or the second liner can be repaired. For example, when the liner, e.g., a portion of the liner, has a surface roughness greater than 12 microinches, the portion of the liner having this surface roughness can be removed. Generally, repair is performed when part of the liner chips or breaks, exposing a new surface. Chips or breaks can occur through normal use of the liners. The new surface can have a surface roughness of greater than 12 microinches. The removed portion of the liner can be ground and/or polished until the surface roughness is less than or equal to 12 microinches, for example, less than or equal to 8 microinches, for example, less than or equal to 4 microinches, for example, less than or equal to 2 microinches. For example, the surface roughness can be 0.5 microinch to 12 microinches, for example, 1 microinch to 8 microinches. After grinding and/or polishing, the removed portion of the liner can be reinstalled to the same conveyance system or conveyors and reused. The removed portion of the liner can be installed to a different conveyance system or conveyors and reused.

By grinding and/or polishing and reusing the liners, monetary savings can be achieved by reducing or removing the need to purchase and install new crushing tool elements.

EXAMPLES

Example 1

Figure 3:
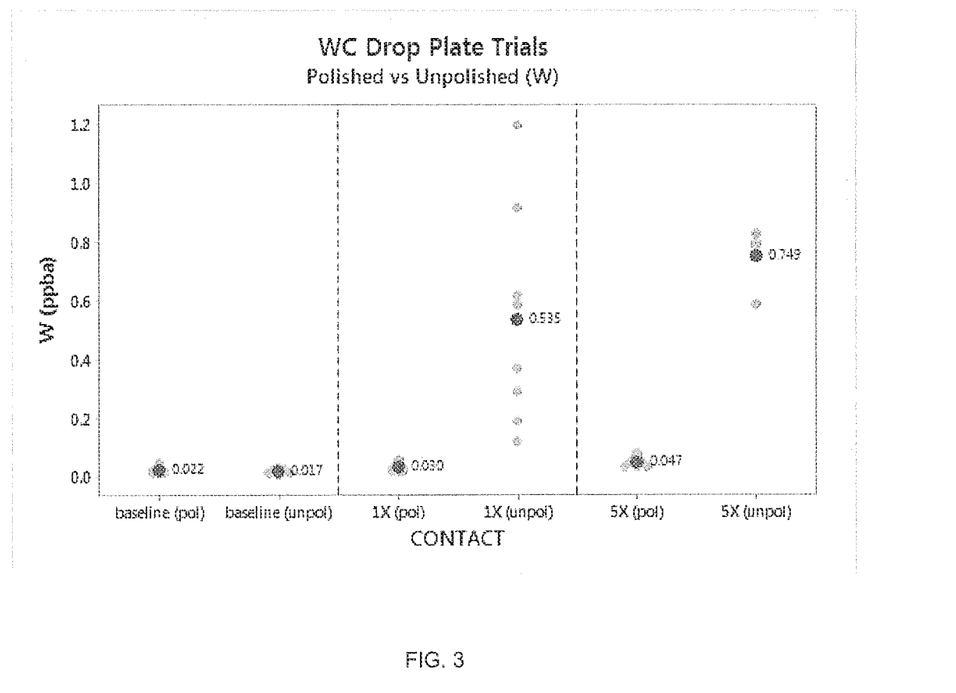
FIG. 3 is a graphical illustration of the number of tungsten impurities present on the surface of chunk polysilicon product after various number of drops onto the surface of a polished tungsten carbide plate.

In this example, unpolished tungsten carbide (WC) in the form of a plate was used as a target for dropping chunk polysilicon pieces a number of times. The polysilicon was then sampled for trace surface metals. FIG. 3 shows the presence of tungsten (W) on the samples after the drops. The amount of tungsten is measured by digesting a surface layer off the silicon samples and measuring the impurity concentration by Inductively Coupled Mass Spectrometry Analysis (ICP-MS analysis) and is expressed in parts per billion atomic (ppba). There were thirteen samples for the polished baseline, ten samples for the unpolished baseline, sixteen samples for the polished 1×, eight samples for the unpolished 1×, sixteen samples for the polished 5×, and 4 samples for the unpolished 5×. For the baseline, no chunk polysilicon product was dropped. For 1×, chunk polysilicon was dropped 1 time, and for 5×, chunk polysilicon was dropped 5 times.

As can be seen in FIG. 3, the amount of impurities present on the polysilicon increased with an increasing number of drops, where 0.75 ppba tungsten was seen on the polysilicon after 5 drops on the unpolished plate. Further, the overall quantity of impurities present on the polysilicon drastically decreased with the surface polishing of the plate. The number of impurities still increased with the number of drops, but for the polished surface, went from 0.02 to 0.03 to 0.05, while the unpolished surface went from 0.02 to 0.54 to 0.75.

Example 2

Figure 4:
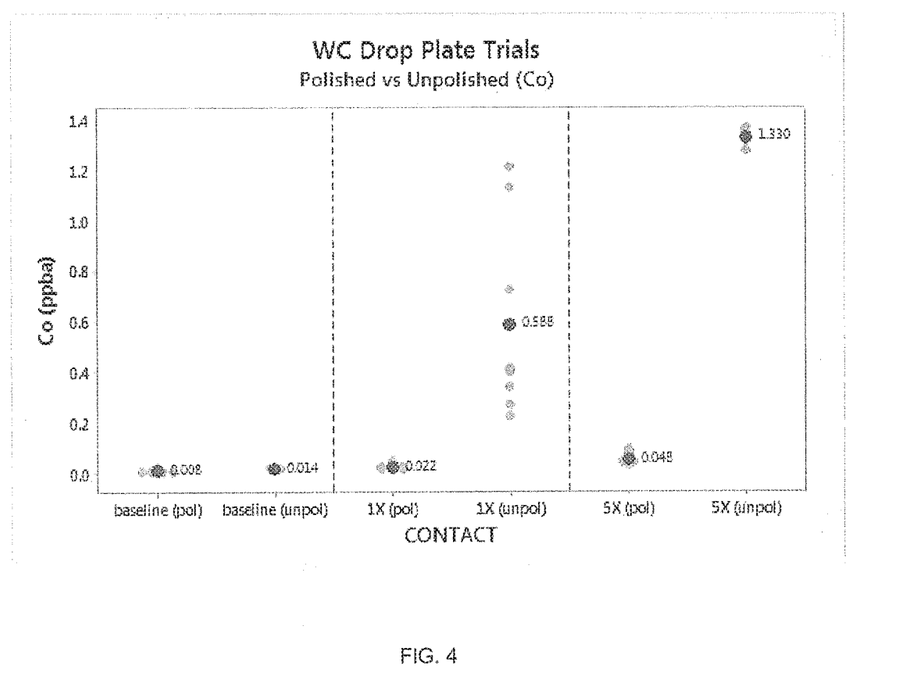
FIG. 4 is a graphical illustration of the number of cobalt impurities present on the surface of chunk polysilicon product after various number of drops onto the surface of a polished tungsten carbide plate.

In this example, polished tungsten carbide (WC) in the form of a plate was used as a target for dropping chunk polysilicon pieces a number of times. The plate was polished to a surface roughness of 1 microinch. The polysilicon was then sampled for trace surface metals. FIG. 4 shows the presence of cobalt (Co) on the samples after the drops. The amount of cobalt is measured by digesting a surface layer off the silicon samples and measuring the impurity concentration by ICP-MS analysis and is expressed in parts per billion atomic (ppba). There were thirteen samples for the polished baseline, ten samples for the unpolished baseline, sixteen samples for the polished 1×, eight samples for the unpolished 1×, sixteen samples for the polished 5×, and 4 samples for the unpolished 5×. For the baseline, no chunk polysilicon product was dropped. For 1×, chunk polysilicon was dropped 1 time, and for 5×, chunk polysilicon was dropped 5 times.

As can be seen in FIG. 4, the amount of impurities present on the polysilicon increased with an increasing number of drops, where 1.33 ppba cobalt was seen on the polysilicon after 5 drops on the unpolished plate. Further, the overall quantity of impurities present on the polysilicon drastically decreased with the surface polishing of the plate. The number of impurities still increased with the number of drops, but the highest amount of impurities found was only 0.048 ppba cobalt, which is a 96% reduction in the number of impurities present on the polysilicon.

Example 3

The results demonstrate that with the use of a polished surface, the number of impurities present can be greatly reduced, minimizing or eliminating the need for additional surface cleaning of impurities from the surface of the polysilicon as well as less impurities being present in the final product.

The methods, crushing tools, and conveyance systems disclosed herein include at least the following embodiments:

Embodiment 1

A method of reducing contamination in a silicon product, comprising: moving silicon pieces along a conveyance system, wherein the conveyance system comprises a liner having a polished surface finish with a surface roughness of less than or equal to 12 microinches; and moving the silicon pieces across the conveyance system, wherein the silicon pieces contain a reduced number of impurities as compared to silicon pieces in contact with a liner having an unpolished surface.

Embodiment 2

The method of Embodiment 1, wherein the liner comprises a material comprising tungsten, carbon, cobalt, or a combination comprising at least one of the foregoing.

Embodiment 3

The method of Embodiment 2, wherein the material comprises less than or equal to 20 weight percent cobalt.

Embodiment 4

The method of any of the preceding embodiments, wherein the surface roughness is less than or equal to 12 microinches, preferably wherein the surface roughness is less than or equal to 8 microinches, preferably, wherein the surface roughness is less than or equal to 4 microinches, preferably, wherein the surface roughness is less than or equal to 2 microinches.

Embodiment 5

The method of any of the preceding embodiments, wherein the surface roughness is 0.5 microinch to 12 microinches, preferably wherein the surface roughness is 1 microinch to 8 microinches.

Embodiment 6

The method of any of the preceding embodiments, wherein the conveyance system comprises at least one conveyance device configured to move silicon pieces from a starting point to a finishing point.

Embodiment 7

The method of Embodiment 6, further comprising moving the silicon pieces from a first conveyance device to a second conveyance device, wherein the first conveyance device is disposed above the second conveyance device.

Embodiment 8

The method of Embodiment 7, wherein the surface roughness of a liner of the second conveyance device remains unchanged when the silicon pieces are dropped from the first conveyance device onto the second conveyance device.

Embodiment 9

The method of any of the preceding embodiments, wherein the conveyance system further comprises a first conveyor and a second conveyor and wherein the method further comprises moving the silicon pieces from the first conveyor to the second conveyor, wherein the first conveyor is at a height, $h_1$, and the second conveyor is at a height, $h_2$, wherein $h_1$ is greater than $h_2$; wherein the first conveyor comprises a first liner and wherein the second conveyor comprises a second liner; wherein the first liner and the second liner comprise a material comprising tungsten, carbon, cobalt, nickel, chromium, or a combination comprising at least one of the foregoing.

Embodiment 10

The method of Embodiment 9, wherein the material comprises tungsten carbide, tungsten carbide with a cobalt binder, tungsten carbide with a nickel binder, chromium carbide, chromium carbide with a nickel binder, or a combination comprising at least one of the foregoing.

Embodiment 11

The method of Embodiment 9 or Embodiment 10, wherein the first liner has a polished surface finish with a surface roughness of less than or equal to 12 microinches; and wherein the second liner has a polished surface finish with a surface roughness of less than or equal to 12 microinches before and after the silicon pieces are moved from the first conveyor to the second conveyor.

Embodiment 12

The method of any of Embodiments 9-11, wherein the surface roughness is 0.5 microinch to 12 microinches, preferably wherein the surface roughness is 1 microinch to 8 microinches.

Embodiment 13

The method of any of Embodiments 9-12, further comprising moving the silicon pieces across the second conveyor, wherein the silicon pieces contain a reduced number of impurities as compared to silicon pieces in contact with a liner having an unpolished surface.

Embodiment 14

A method of repairing the liner of any of the preceding embodiments, comprising: removing a portion of a liner when the portion of the liner a surface roughness of greater than 12 microinches; grinding and/or polishing the portion of the liner having a surface roughness of greater than 12 microinches, until the surface roughness is less than or equal to 12 microinches; and reinstalling the portion of the liner to the same or a different conveyance system or conveyors for reuse.

Embodiment 15

A crushing tool, comprising: crushing tool elements configured to crush silicon into fragments, wherein the crushing tool elements comprise a surface comprising a polished surface finish with a surface roughness of less than or equal to 12 microinches; and wherein the crushing tool elements comprise a material comprising tungsten, carbon, cobalt, or a combination comprising at least one of the foregoing.

Embodiment 16

A method of repairing the crushing tool of Embodiment 15, comprising: removing a crushing tool element from the crushing tool when the crushing tool element has a surface roughness of greater than 12 microinches; grinding and/or polishing the crushing tool element having a surface roughness of greater than 12 microinches, until the surface roughness is less than or equal to 12 microinches; and reinstalling the crushing tool element to the same or a different crushing tool for reuse.

Embodiment 17

A conveyance system, comprising: a first conveyor discharged onto a second conveyor, wherein the first conveyor is at a height, $h_1$, and the second conveyor is at a height, $h_2$, wherein $h_1$ is greater than $h_2$; wherein the first conveyor comprises a first liner and wherein the second conveyor comprises a second liner; wherein the first liner and the second liner comprise a material comprising tungsten, carbon, cobalt, nickel, chromium, or a combination comprising at least one of the foregoing.

Embodiment 18

The conveyance system of Embodiment 17, wherein the first liner has a polished surface finish with a surface roughness of less than or equal to 12 microinches; and wherein the second liner has a polished surface finish with a surface roughness of less than or equal to 12 microinches before and after the silicon pieces are moved from the first conveyor to the second conveyor.

Embodiment 19

The conveyance system of Embodiment 17 or Embodiment 18, wherein the surface roughness is 0.5 microinch to 12 microinches, preferably wherein the surface roughness is 1 microinch to 8 microinches.

Embodiment 20

A method of repairing the conveyance system of any of Embodiments 17-19, comprising: removing a portion of first conveyor and/or the second conveyor from the conveyance system when the portion of the conveyance system has a surface roughness of greater than 12 microinches; grinding and/or polishing the first conveyor and/or the second conveyor having a surface roughness of greater than 12 microinches, until the surface roughness is less than or equal to 12 microinches; and reinstalling the first conveyor and/or the second conveyor to the same or a different conveyance system for reuse.

The singular forms "a," "an," and "the" include plural referents unless the context clearly dictates otherwise. "Or" means "and/or." The modifier "about" used in connection with a quantity is inclusive of the stated value and has the meaning dictated by the context (e.g., includes the degree of error associated with measurement of the particular quantity). The notation "±10%" means that the indicated measurement can be from an amount that is minus 10% to an amount that is plus 10% of the stated value. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group.

The suffix "(s)" is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs. A "combination" is inclusive of blends, mixtures, alloys, reaction products, and the like.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of repairing a conveyance system comprising a liner having a polished surface finish with a surface roughness of less than or equal to 12 microinches, comprising:
   removing a portion of the liner when the portion of the liner has a surface roughness of greater than 12 microinches;
   grinding and/or polishing the portion of the liner having a surface roughness of greater than 12 microinches, until the surface roughness is less than or equal to 12 microinches; and
   reinstalling the portion of the liner to the same or a different conveyance system or conveyors for reuse.

2. The method of claim 1, wherein the liner comprises a material comprising tungsten, carbon, cobalt, or a combination comprising at least one of the foregoing.

3. The method of claim 2, wherein the material comprises less than or equal to 20 weight percent cobalt.

4. The method of claim 1, wherein the conveyance system comprises at least one conveyance device configured to move silicon pieces from a starting point to a finishing point.

5. The method of claim 4, further comprising moving the silicon pieces from a first conveyance device to a second conveyance device, wherein the first conveyance device is disposed above the second conveyance device, wherein the liner is present in the first conveyance device and wherein a second liner is present in the second conveyance device.

6. The method of claim 5, wherein the surface roughness of the second liner remains unchanged when the silicon pieces are dropped from the first conveyance device onto the second conveyance device.

7. The method of claim 1, wherein the conveyance system further comprises a first conveyor and a second conveyor and wherein the method further comprises moving the silicon pieces from the first conveyor to the second conveyor, wherein the first conveyor is at a height, $h_1$, and the second conveyor is at a height, $h_2$, wherein $h_1$ is greater than $h_2$;

wherein the first conveyor comprises the liner and wherein the second conveyor comprises a second liner;

wherein the liner and the second liner comprise a material comprising tungsten, carbon, cobalt, nickel, chromium, or a combination comprising at least one of the foregoing.

8. The method of claim 7, wherein the material comprises tungsten carbide, tungsten carbide with a cobalt binder, tungsten carbide with a nickel binder, chromium carbide, chromium carbide with a nickel binder, or a combination comprising at least one of the foregoing.

9. The method of claim 7, wherein the second liner has a polished surface finish with a surface roughness of less than or equal to 12 microinches before and after the silicon pieces are moved from the first conveyor to the second conveyor.

10. The method of claim 9, wherein the surface roughness of the liner and/or the second liner is 0.5 microinch to 12 microinches.

11. The method of claim 7, further comprising moving the silicon pieces across the second conveyor, wherein the silicon pieces contain a reduced number of impurities as compared to silicon pieces in contact with a liner having an unpolished surface.

12. A method of repairing a conveyance system, comprising a first conveyor discharging silicon pieces onto a second conveyor, wherein the first conveyor is at a height, $h_1$, and the second conveyor is at a height, $h_2$, wherein $h_1$ is greater than $h_2$; wherein the first conveyor comprises a first liner and wherein the second conveyor comprises a second liner; wherein the first liner and the second liner comprise a material comprising tungsten, carbon, cobalt, nickel, chromium, or a combination comprising at least one of the foregoing, wherein the method comprises:

removing a portion of the first conveyor and/or the second conveyor from the conveyance system when the portion of the conveyance system has a surface roughness of greater than 12 microinches;

grinding and/or polishing the first conveyor and/or the second conveyor having a surface roughness of greater than 12 microinches, until the surface roughness is less than or equal to 12 microinches; and reinstalling the first conveyor and/or the second conveyor to the same or a different conveyance system for reuse.

13. The method of claim 12, wherein the first liner has a polished surface finish with a surface roughness of less than or equal to 12 microinches; and wherein the second liner has a polished surface finish with a surface roughness of less than or equal to 12 microinches before and after the silicon pieces are moved from the first conveyor to the second conveyor.

14. The method of claim 12, wherein the surface roughness of the first liner and/or the second liner is 0.5 microinch to 12 microinches.

* * * * *